J. W. BENHAM.
PAPER DISHES.

No. 184,322. Patented Nov. 14, 1876.

Attest
L. Goldstein
Ullman Strong

INVENTOR
James W. Benham
By H. S. Warner
Attorney.

UNITED STATES PATENT OFFICE.

JAMES W. BENHAM, OF CHICAGO, ILLINOIS.

IMPROVEMENT IN PAPER DISHES.

Specification forming part of Letters Patent No. 184,322, dated November 14, 1876; application filed October 19, 1876.

*To all whom it may concern:*

Be it known that I, JAMES W. BENHAM, of Chicago, in the county of Cook and State of Illinois, have invented certain new and useful Improvements in Paper Dishes, of which the following is a full, clear, and exact description, which will enable others skilled in the art to which my invention appertains to make and use my said improvements, reference being had to the accompanying drawing, forming a part hereof, and in which—

Figure 1:
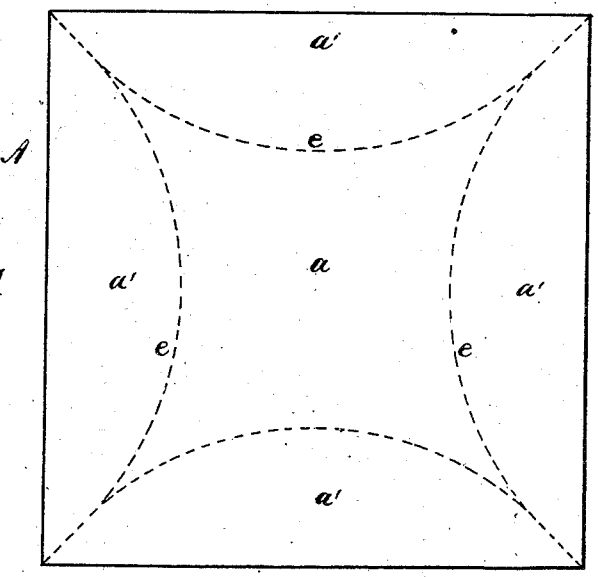
Figure 2:
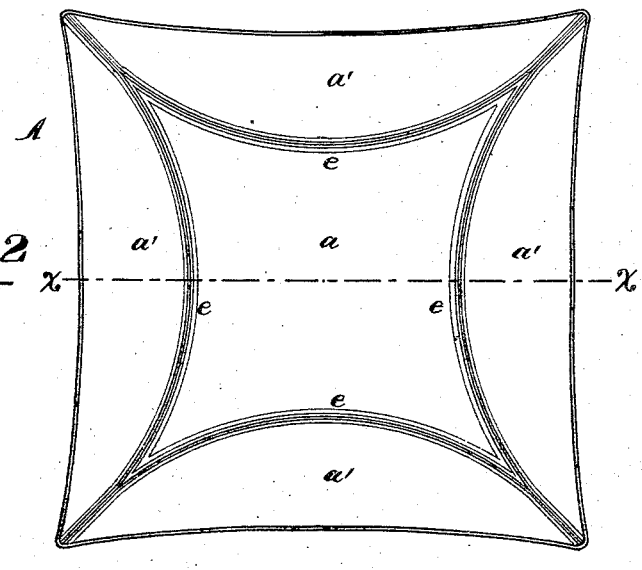

Figure 1 is a bottom view of a dish embodying my invention; Fig. 2, a top or plan view thereof; and Fig. 3, a section in the plane of the line $x\ x$.

Like letters of reference indicate like parts.

The object of my invention is to make a cheap paper dish, which may be useful for various purposes; and to that end my invention consists in the peculiar manner in which I construct or raise the parts which constitute the sides of the dish, substantially as hereinafter specified.

In the drawing, A represents a dish embodying my invention. I make this dish in one sheet of paper, pasteboard, straw-board, card-board, or other fibrous material. $a$ is the part which constitutes the bottom of the dish. $a'\ a'$ are upturned parts, constituting the sides.

Figure 3:
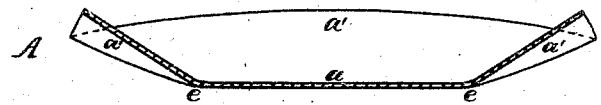

It will be observed, on reference to Figs. 1 and 2, that the lines of the junction of the sides with the bottom lie in the arcs of circles having centers outside the dish, and opposite the sides, respectively, as represented at $e\ e$. By making the lower edges of the sides in this manner, the dish need not be then scored in order to admit of the sides being turned up in a well-defined manner, so as to give a considerable depth to the dish, as represented in Fig. 3. This construction, whether the dish is scored or unscored, also admits of the sides being thus turned up without crimping them or causing them to lap each other at the ends or corners.

I am aware that dishes have heretofore been made by pressing paper-pulp into various forms, and that various forms of sheet-paper dishes have also been made, and, therefore, I do not here intend to claim such, broadly; but

Having thus described my invention, what I claim as new, and desire to secure by Letters Patent, is—

As a new article of manufacture, the dish A, made in one piece or sheet of fibrous material, and wherein the sides $a'\ a'$ meet the bottom $a$ in the curved lines $e\ e$, substantially as shown and described.

JAMES W. BENHAM.

Witnesses:
F. F. WARNER,
F. J. SMITH.